US012625982B2

(12) United States Patent (10) Patent No.: US 12,625,982 B2
Mandya Lakshman et al. (45) Date of Patent: May 12, 2026

(54) SYSTEMS AND METHODS FOR SHARING NETWORK RESOURCES FOR CONCURRENT I/O OPERATIONS

(71) Applicant: Dell Products L.P., Round Rock, TX (US)

(72) Inventors: Nagaraja Mandya Lakshman, Bangalore (IN); Vinith Narra, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 18/422,030

(22) Filed: Jan. 25, 2024

(65) Prior Publication Data

US 2025/0245358 A1 Jul. 31, 2025

(51) Int. Cl.
*G06F 21/60* (2013.01)
*G06F 9/50* (2006.01)

(52) U.S. Cl.
CPC .......... *G06F 21/606* (2013.01); *G06F 9/5027* (2013.01)

(58) Field of Classification Search
CPC ............................ G06F 21/606; G06F 9/5027
See application file for complete search history.

(56) References Cited

U.S. PATENT DOCUMENTS

| | | | |
|---|---|---|---|
| 9,760,928 B1 * | 9/2017 | Ward, Jr. ........... | G06Q 30/0619 |
| 2015/0052404 A1 * | 2/2015 | Henriques ............. | G06F 1/3215 |
| | | | 714/43 |
| 2019/0052726 A1 * | 2/2019 | Power ..................... | H04L 67/60 |
| 2022/0329570 A1 * | 10/2022 | Sharma ................... | H04L 63/04 |

* cited by examiner

*Primary Examiner* — El Hadji M Sall
(74) *Attorney, Agent, or Firm* — Fogarty LLP

(57) ABSTRACT
Systems and methods for sharing secure channel access for the management of multiple computing resources are herein disclosed. According to one embodiment, an Information Handling System (IHS) includes computer-executable instructions to receive a plurality of Input/Output (I/O) requests from the vendor computing device in which the I/O requests are directed to one of the customer computing resources. The instructions may also establish a secure channel between the vendor computing device and the one customer computing resource, and send the first I/O requests to the one customer computing resource through the secure channel.

18 Claims, 8 Drawing Sheets

300

```
{
  "VERSION": "2012-10-17",
  "STATEMENT": [
    {
      "SID": "VISUALEDITOR0",
      "EFFECT": "ALLOW",
      "ACTION": [
        "IAM:LISTACCOUNTALIASES",
        "EC2:ALLOCATEADDRESS",
        "EC2:ASSOCIATEVPCCIDRBLOCK",
        "EC2:AUTHORIZESECURITYGROUPEGRESS",
        "EC2:AUTHORIZESECURITYGROUPINGRESS",
        "EC2:CREATEKEYPAIR",
        "EC2:CREATENETWORKINTERFACE",
        "EC2:CREATESECURITYGROUP",
        "EC2:CREATESUBNET",
        "EC2:CREATETAGS",
        "EC2:CREATEVPCENDPOINT",
        "EC2:CREATEVPC",
        "EC2:DELETEKEYPAIR",
        "EC2:DELETENETWORKINTERFACE",
        "EC2:DELETESECURITYGROUP",
        "EC2:DELETESUBNET",
        "EC2:DELETEVOC",
        "STS:SETSOURCEIDENTITY",
        "STS:TAGSESSION"
      ],
      "RESOURCE": "*"
    }
  ]
}
```

```
{
    "VERSION" : "2012-10-17",
    "STATEMENT": [
        {
            "EFFECT": "ALLOW",
            "PRINCIPAL": {
                "AWS": "PRINCIPAL-ARN"
            },
            "ACTION": "STS:ASSUMEROLE",
            "CONDITION": {
                "STRINGEQUALS": {
                    "STS:EXTERNALID": "EXTERNAL-ID"
                },
                "BOOL": {
                    "AWS:MULTIFACTORAUTHPRESENT": "TRUE"
                }
            }
        },
        {
            "EFFECT": "ALLOW",
            "PRINCIPAL": {
                "AWS": "PRINCIPAL-ARN"
            },
            "ACTION": "STS:TAGSESSION"
        },
        {
            "EFFECT": "ALLOW":
            "PRINCIPAL": {
                "AWS": "PRINCIPAL-ARN"
            },
            "ACTION": "STS:SETSOURCEIDENTITY"
        }
    ]
}
```

FIG. 4

SYSTEMS AND METHODS FOR SHARING NETWORK RESOURCES FOR CONCURRENT I/O OPERATIONS

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

IHSs may be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many computer processing architectures have recently migrated toward cloud computing. Cloud computing generally involves the delivery of computing services over the Internet. Whereas on-premises computing solutions can refer to in-house hosted software (e.g., on local servers, private clouds, etc.) that may be supported by a third party vendor or provider, cloud computing solutions may refer to software that is hosted and maintained by the same vendor. With cloud computing, a virtualized pool of resources, from raw compute power at the infrastructure level to application functionality, is often made available to a client, on demand, by a provider. One particular advantage of cloud computing is the ability to apply abstracted versions of compute, storage, and network resources to workloads, as needed, and tap into an abundance of prebuilt services. Cloud computing may enable users to tap into additional capabilities without requiring the investment of the infrastructure, such as new hardware or software. Rather, users often pay the provider of the cloud service a subscription fee or in some cases lease the infrastructure that they use.

Multi-cloud computing refers to the use of two or more clouds from different cloud providers. This may include any mix of Infrastructure, Platform, or Software as a Service (IaaS, PaaS, or SaaS). Multi-cloud computing may be used to address specific business requirements or to avoid the limitations of a single-vendor cloud strategy. The multi-cloud environment may include cloud networks or cloud hosting environments provided by different cloud service providers. In a multi-cloud environment, the cloud networks may be managed by a multi-cloud management platform. The multi-cloud management platform includes hardware, software, firmware, or a combination thereof which provides a unified interface for deployment, provisioning, and monitoring of different cloud networks in the multi-cloud environment.

SUMMARY

Systems and methods for sharing secure channel access for the management of multiple computing resources are herein disclosed. According to one embodiment, an Information Handling System (IHS) includes computer-executable instructions to receive a plurality of Input/Output (I/O) requests from the vendor computing device in which the I/O requests are directed to one of the customer computing resources. The instructions may also establish a secure channel between the vendor computing device and the one customer computing resource, and send the first I/O requests to the one customer computing resource through the secure channel.

According to another embodiment, a network resource sharing method includes the steps of receiving a plurality of first Input/Output (I/O) requests from a vendor computing device for one of a plurality of customer computing resources, establishing a secure channel between the vendor computing device and the one customer computing resource, and sending the first I/O requests to the one customer computing resource through the secure channel. The first I/O requests are directed to one of the customer computing resources.

According to yet another embodiment, a computer program product includes a non-transitory computer-readable storage medium having program instructions stored thereon that, upon execution by an IHS, cause the IHS to receive a plurality of first Input/Output (I/O) requests from a vendor computing device for one of a plurality of customer computing resources that are provided to a customer by a vendor associated with the vendor computing device, establish a secure channel between the vendor computing device and the one customer computing resource, and send the first I/O requests to the one customer computing resource through the secure channel.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 3 illustrates an example permissions document that may comprise a portion of the access control policy key according to one embodiment of the present disclosure.

FIG. 4 illustrates an example trust policy document that may comprise a portion of the access control policy key according to one embodiment of the present disclosure.

DETAILED DESCRIPTION

Figure 1:
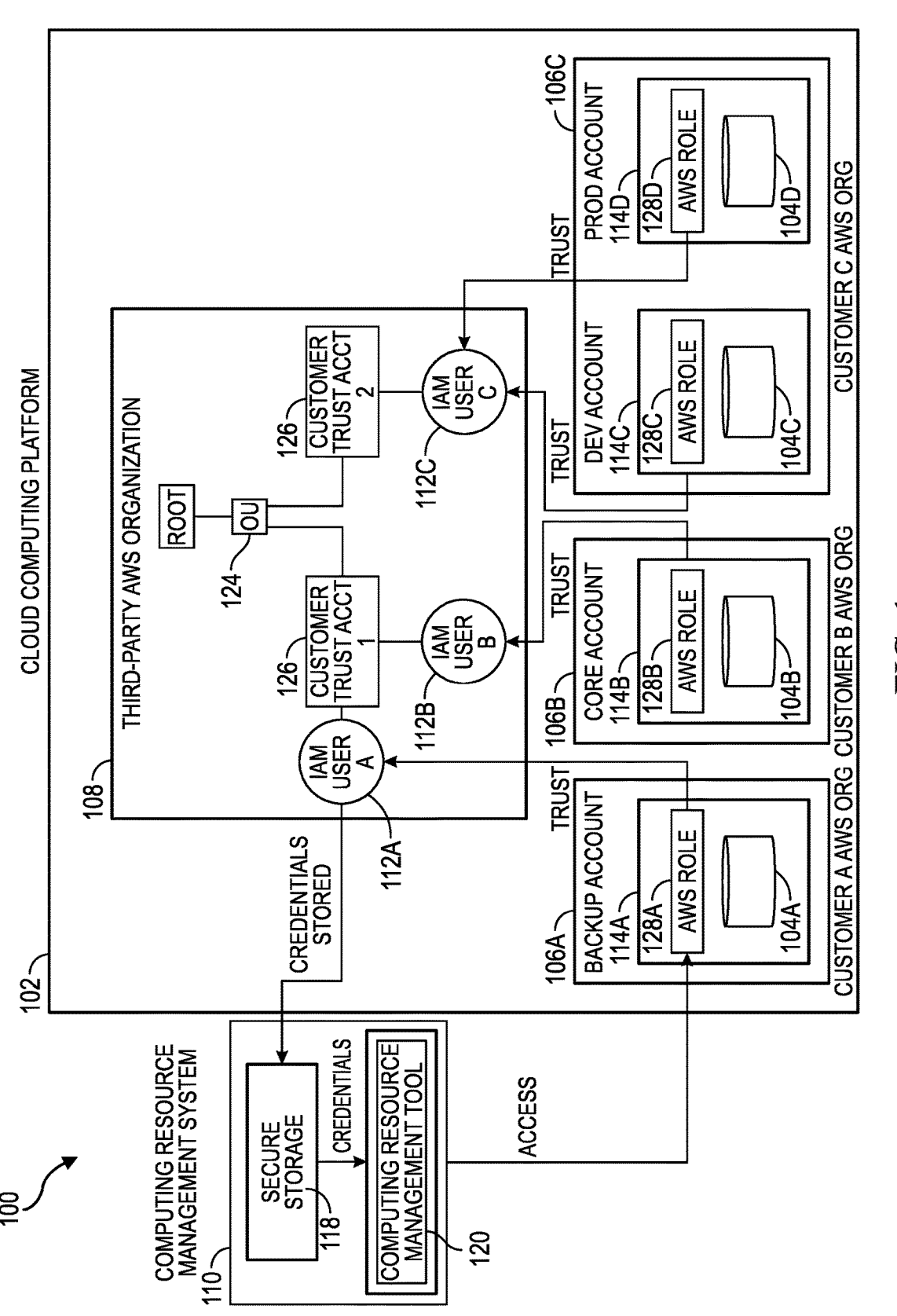
FIG. 1 illustrates an example third-party trusted access system showing how a third-party, such as vendor or maintainer of the computing resources in a cloud computing platform, may be provided with limited access to those computing resources.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Cloud computing generally refers to the delivery of computing resources, especially data storage and computing power, over the Internet without direct active management by the user. The term is generally used to describe data centers available to many users on a pay-for-use basis. As an increasing number of software applications are moving to the cloud and are being developed for the cloud, users are adopting a variety of cloud deployment models. These range from private clouds to public clouds, to a mix of both (i.e., hybrid clouds).

Multi-cloud computing generally refers to the use of at least two or more cloud environments at the same time. Multi-cloud computing refers to the use of two or more clouds from different cloud providers. This may include any mix of Infrastructure, Platform, or Software as a Service (IaaS, PaaS, or SaaS). The term "cloud computing platform" may be used herein to refer to a configuration of distributed storage and/or computing services that may be publicly offered by providers over the Internet. Examples for such cloud platforms may include Amazon Web Services (AWS), Microsoft Azure, and Google Cloud Platform (GCP).

Computing vendors are working on delivery systems that allow customers to easily leverage various storage offerings across today's available computing environments. One goal is to provide customer options to run storage offerings with various public cloud providers and provide a platform that allows for those systems to be managed centrally while also available to the rest of the enterprise environment for workflows and data/application mobility. In particular, it would be beneficial for vendors of cloud computing resources to scale access to cloud computing platform accounts outside the purview or control of the cloud computing platform's control mechanisms.

Providing a platform for managing a vendor's resources across an enterprise customer's multi-cloud storage environment often entails the customer granting vendor access to their public cloud environments. Where security is paramount, it would be beneficial to deliver a solution to access customer environments in a manner that is secure, otherwise customers may not adopt the vendor's multi-cloud product. In order to deliver a platform that provides deployment, ongoing management, and monitoring it would be beneficial for the vendor to programmatically access the customer's environment and hold continued access rather than a short-lived access. Consider how a developer might access a cloud computing platform, such as an AWS account. The developer would be granted an AWS access key ID and a secret access key that is a long-lived credential associated with that individual user. The developer holds onto and uses the credential to authenticate, and access AWS resources. There are, however, security challenges associated with sharing AWS credentials to a third-party (e.g., computing resource vendor) to enable them to access an AWS account.

Vendors would like to support many customers using its multi-cloud platform, but cloud computing platforms typically do not advise on how a third-party (e.g., vendor) should scale trusted access for many customers, nor does it advise on how third-party solutions should access customer environments from outside the cloud computing platform's control. As more users adopt multi-cloud products, the overall solution should scale accordingly. For example, there are AWS limitations around the number of AWS accounts in an AWS organization, and other factors that can limit scaling trusted access.

Conventional attempts have included establishing a Cloud Formation Template (CFT) that specifies certain access rights that may be provided to a third-party entity, such as a vendor of the resources configured in the cloud computing platform. Such a technique still requires that the customer shares their keys with the vendor, which could potentially yield security issues. Additionally, the ability to modify the access rights is not easily accomplished without both parties approval, and may possess challenges associated with ownership of credentials and credential rotation.

Other conventional attempts have included NETAPP ONTAP, which is provided by AMAZON and provides a fully managed AWS service, or NETAPP BLUEXP in which the customer grants trust to an AWS entity or service running in AWS. Neither of these conventional tools, however, execute a deployment or monitoring outside of AWS using AWS account trust. That is, all of the aforementioned tools are maintained within the control of the cloud computing platform (e.g., AWS, Azure, GCP, etc.), and as such, yield scaling problems when large numbers of customers each with their own levels of security tolerance that are required to use the cloud computing platform to add, modify, or revoke access rights to third-parties, such as the vendor or maintainer of the computing resources configured in the cloud computing platform.

FIG. 1 illustrates an example third-party trusted access system 100 showing how a third-party, such as vendor or maintainer of the computing resources in a cloud computing platform, may be provided with limited access to those computing resources. As mentioned previously, it would be beneficial to provide limited access to the computing resources of a cloud computing platform for various reasons, such as diagnosing problems or bugs encountered by the computing resources, providing ongoing software updates to the computing resources, configuring or re-configuring the computing resources on an as-needed basis, and the like. While the present embodiments are described as being directed to an AWS cloud provider, it should be appreciated that the features of the present disclosure may use any suitable cloud provider, such as Microsoft Azure, or Google Cloud Platform (GCP).

Initially referring to FIG. 1, the third-party trusted access system 100 includes a cloud computing platform 102 that provides or otherwise leases computing resources 104a-d (collectively 104) to its customers 106a-c (collectively 106). While the computing resources 104 are shown herein to be storage resources, it should be appreciated that the computing resources 104 may include any combination of computing resources 104, such as compute resources, and networking resources. The third-party trusted access system 100 also includes a third-party AWS organization 108 that is provided to the vendor of the computing resources 104 by the cloud computing platform 102, and a computing resource management system 110 that is maintained by the vendor of the computing resources 104.

Each customer 106 may have one or more accounts 114a-d (collectively 114). In general, each customer account 114 specifies which computing resources 104 in the cloud computing platform 102 are to be allocated to that customer account 114. For example, customers 106a-b are each provided with an access control policy key 112a-b for their associated customer account 114a-b, while customer 106c is provided with a single access control policy key 112c for each of their development customer account 114c and production customer account 114d.

According to embodiments of the present disclosure, the third-party AWS organization 108 provides a single access control policy key 112a-c (collectively 112) to each customer 106 that specifies how the computing resource management system 110 is allowed to access the computing resources 104. In one embodiment, the access control policy key 112 may comprise an AWS Identity and Access Management (IAM) policy key. The IAM policy key specifies users or other resources that can access services and resources in an AWS cloud computing platform 102, manage permissions, and analyze access to refine permissions across the cloud computing platform 102. Moreover, the IAM policy key provides specific permissions to one or more users associated with the customer 106 to which the IAM policy key has been issued.

Each customer 106 may provide a copy of the access control policy key 112 to the computing resource management system 110, which it in turn, stores the access control policy key 112 in a secure storage 118 (e.g., digital vault). The computing resource management system 110 also includes a computing resource management tool 120, such as CLOUDIQ or APEX NAVIGATOR, which manages the operation of the computing resources 104. The computing resource management tool 120 uses the access control policy key 112 to access the computing resources 104 using policies specified in each access control policy key 112.

Figure 2:
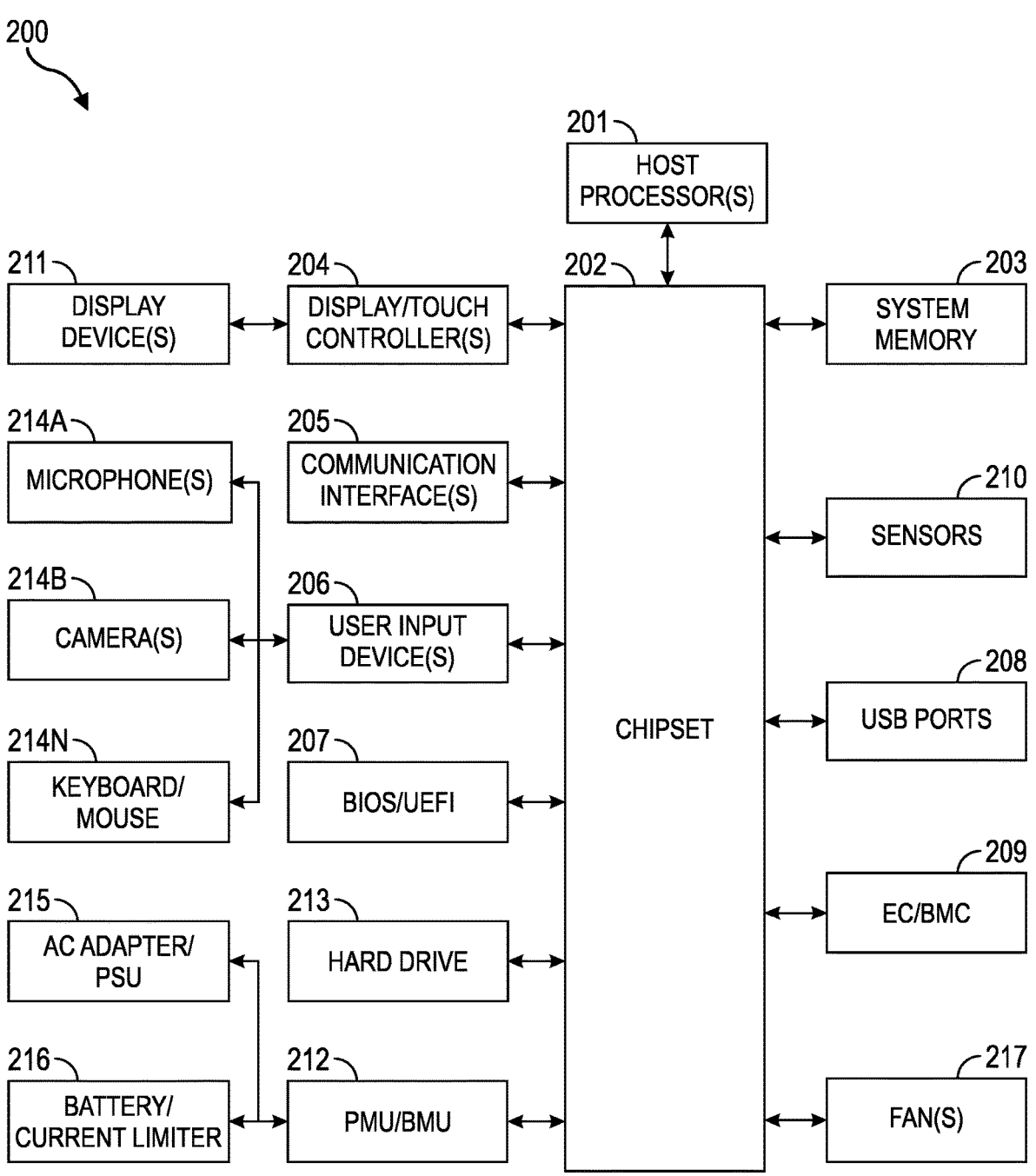
FIG. 2 is a block diagram of components of an IHS, of which one or more may be used to implement embodiments of the third-party trusted access system of FIG. 1.

FIG. 2 is a block diagram of components of an IHS 200, of which one or more may be used to implement embodiments of the third-party trusted access system of FIG. 1. As depicted, IHS 200 includes host processor(s) 201. In various embodiments, IHS 200 may be a single-processor system, a multi-processor system including two or more processors, and/or a heterogeneous computing platform. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). In some embodiments, the IHS 200 may be used to provide any suitable cloud provider resource, such as a Virtual Private Cloud (VPC), Elastic Compute Cloud (EC2), IAM resources, and/or Pivotal Container Services (PKS).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 may include, but are not limited to, microphone(s) 214A, camera(s) 214B, and keyboard/mouse 214N. Other user input devices 206 may include a touchpad, trackpad, stylus or active pen, totem, etc.

Each user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.). In certain embodiments, chipset 202 may further provide an interface for communications with hardware sensors 210.

Sensors 210 may be disposed on or within the chassis of IHS 200, or otherwise coupled to IHS 200, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, number lock, battery, power, wireless LAN, sleep, etc.), managing PMU/BMU 212, alternating current (AC) adapter/Power Supply Unit (PSU) 215 and/or battery/current limiter 216, allowing remote diagnostics and remediation over network(s) 104, and so on. For example, EC/BMC 209 may implement operations for interfacing with power adapter/PSU 215 in managing power for IHS 200. Such operations may be performed to determine the power status of IHS 200, such as whether IHS 200 is operating from AC adapter/PSU 215 and/or battery 216.

Firmware instructions utilized by EC/BMC 209 may also be used to provide various core operations of IHS 200, such as power management and management of certain modes of IHS 200 (e.g., turbo modes, maximum operating clock frequencies of certain components, etc.). In addition, EC/BMC 209 may implement operations for detecting certain changes to the physical configuration or posture of IHS 200. For instance, when IHS 200 is embodied as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, tent, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture.

When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. When IHS 200 has two displays open to form a triangular structure sitting on a horizontal surface, such that a hinge between the displays is at the top vertex of the triangle, EC/BMC 209 may determine IHS 200 to be in a tent posture. In some implementations, EC/BMC 209 may also determine if display(s) 211 of IHS 200 are in a landscape or portrait orientation. In some cases, EC/BMC 209 may be installed as a Trusted Execution Environment (TEE) component to the motherboard of IHS 200.

Additionally, or alternatively, EC/BMC 209 may be configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component, compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source (e.g., AC outlet or mains) through an AC adapter/PSU 215. AC adapter/PSU 215 may include an adapter portion having a central unit (e.g., a power brick, wall charger, or the like) configured to draw power from an AC outlet via a first electrical cord, convert the AC power to direct current (DC) power, and provide DC power to IHS 200 via a second electrical cord.

Additionally, or alternatively, AC adapter/PSU 215 may include an internal or external power supply portion (e.g., a switching power supply, etc.) connected to the second electrical cord and configured to convert AC to DC. AC adapter/PSU 215 may also supply a standby voltage, so that most of IHS 200 can be powered off after preparing for hibernation or shutdown, and powered back on by an event (e.g., remotely via wake-on-LAN, etc.). In general, AC adapter/PSU 215 may have any specific power rating, measured in volts or watts, and any suitable connectors.

IHS 200 may also include internal or external battery 216. Battery 216 may include, for example, a Lithium-ion or Li-ion rechargeable device capable of storing energy sufficient to power IHS 200 for an amount of time, depending upon the IHS's workloads, environmental conditions, etc. In some cases, a battery pack may also contain temperature sensors, voltage regulator circuits, voltage taps, and/or charge-state monitors. For example, battery 216 may include a current limiter, or the like.

In some embodiments, battery 216 may be configured to detect overcurrent or undervoltage conditions using Limits Management Hardware (LMH). As used herein, the term "overcurrent" refers to a condition in an electrical circuit that arises when a normal load current is exceeded (e.g., overloads, short circuits, etc.). Conversely, the term "undervoltage" refers to a condition (e.g., "brownout") where the applied voltage drops to X % of rated voltage (e.g., 90%), or less, for a predetermined amount of time (e.g., 1 minute).

Power Management Unit (PMU) 212 governs power functions of IHS 200, including AC adapter/PSU 215 and battery 216. For example, PMU 212 may be configured to: monitor power connections and battery charges, charge batteries, control power to other components, devices, or ICs, shut down components when they are left idle, control sleep and power functions (On and Off), manage interfaces for built-in keypad and touchpads, regulate real-time clocks (RTCs), and the like.

In some implementations, PMU 212 may include one or more Power Management Integrated Circuits (PMICs) configured to control the flow and direction or electrical power in IHS 200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 212 may include a Battery Management Unit (BMU) (referred to collectively as "PMU/BMU 212"). AC adapter/PSU 215 may be removably coupled to a battery charge controller within PMU/BMU 212 to provide IHS 200 with a source of DC power from battery cells within battery 216 (e.g., a lithium ion (Li-ion) or nickel metal hydride (NiMH) battery pack including one or more rechargeable batteries). PMU/BMU 212 may include non-volatile memory and it may be configured to collect and store battery status, charging, and discharging information, and to provide that information to other IHS components, such as, for example devices within heterogeneous computing platform 300 (FIG. 3).

Examples of information collected and stored in a memory within PMU/BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 212. Power draw data may also be monitored with respect to individual components or devices of IHS 200. Whenever applicable, PMU/BMU 212 may administer the execution of a power policy, or the like.

IHS 200 may also include one or more fans 217 configured to cool down one or more components or devices of IHS 200 disposed inside a chassis, case, or housing. Fan(s) 217 may include any fan inside, or attached to, IHS 200 and used for active cooling. Fan(s) 217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within a heterogeneous computing platform. As such, IHS 200 may assume different form factors including, but not limited to: servers, workstations, desktops, laptops, appliances, video game consoles, tablets, smartphones, etc.

Best practice for granting third party access entails defining a role with a set of permissions that the third party is trusted within an account 126. In the present case, the customer grants a third-party entity (e.g., an AWS entity) certain trusted access in which no credentials are exchanged. The third-party entity owns the necessary credentials to gain access to the customer's account and is responsible for managing them, which eliminates the need for both parties to act to carry out a credential change. The customer maintains the ability to disable third-party access at any time.

Many cloud computing platforms, such as AWS, provide options to trust different entities to assume a role. The design is to use an entity, such as an AWS Identity and Access Management (IAM) user, as a principal in the trust policy. With a single AWS IAM user dedicated to each customer, the system can be scaled to support a relatively large quantity (e.g., 5000 customers) under a single AWS account. Multiple AWS accounts would be used to scale beyond 5000 customers. No two customers trust the same AWS IAM user. Each AWS IAM user is tagged with an identifier for the customer to identify the IAM user resource as belonging to the customer. The IAM user credentials, AWS account IDs, AWS Role AWS Resource Name (ARN), and external ID used in the AWS assume role API call are stored in the secure storage 118 and are used to obtain temporary credentials passed to computing resource management tool 120 for authorized access to the customer's AWS account resources 104.

Regarding conventional attempts where keys are shared between the customer and computing resource vendor as described herein above, if the third-party entity (e.g., vendor) found it mishandled the customer's credentials internally, and there was potentially unintended access to that customer environment, then the way to remedy that access would be to rotate or disable the credentials, which is managed and owned by the customer. The time to resolve such a scenario would depend on identifying the issue, being able to reach the customer, and then tracking down, by the customer, the right person to disable or rotate the credentials. Such action to remedy potentially leaked credentials would likely impact the trusted relationship with that customer. This third-party trusted access system 100 mitigates this problem and allows either the customer or the vendor to act to alleviate the issue.

There is also the concern of ownership with leaked credentials. Consider the scenario where the customer were to provide an access key; however, the customer also accidentally leaked the access key and this led to malicious activity in the customer's account. In this scenario it would be difficult to identify ownership of who leaked the credential. The customer could blame the third-party entity (e.g., computing resource vendor) when it was actually the customer. The third-party trusted access system 100 provides clear ownership of the access credentials. Regarding credential rotation, If the customer owns the credentials, then they also own credential rotation. Rotation is inherently out of any third-party entity's control, and that rotation will render the customer's environment inaccessible between rotation and re-distributing to the third-party entity. The third-party trusted access system 100 provides responsibility of rotation to the third-party entity, and it can maintain access throughout rotation. In summary, the third-party trusted access system 100 provides the ability to manage trusted access from services running outside of the cloud computing platform 102 to numerous (e.g., thousands) of customer accounts at scale by leveraging automation and various technologies.

FIG. 3 illustrates an example permissions document 300 that may comprise a portion of the access control policy key 112 according to one embodiment of the present disclosure. The permissions document 300 is a JSON document defining certain limited actions that may be performed by the computing resource management tool 120. In one aspect, the permissions document 300 may be considered to be a whitelist in which only the actions specified in the permissions document 300 are permitted to be performed by the computing resource management tool 120; all other actions are prohibited. In one embodiment, the permissions document 300 follows the IAM policy standard established by AWS. In another embodiment, entries in the permissions document 300 may be added, modified, or deleted at any time by the customer. Thus, the customer may change third-party access policies at an ongoing basis to adjust for ongoing changes, such as changes in security context, organizational structure, and the like.

FIG. 4 illustrates an example trust policy document 400 that may comprise a portion of the access control policy key 112 according to one embodiment of the present disclosure. The trust policy document 400 is a JSON document specifying the trusted principals to assume a role (e.g., an AWS role). In the present example trust policy document 400, the 'Principal ARN' (e.g., AWS Resource Name) is the unique identifier to the trusted IAM entity. Additionally as can be seen, the trust policy document 400 condition 'AWS:MultiFactorAuthPresent' requires all requests to have been authenticated with Multi-Factor Authentication (MFA).

Figure 5:
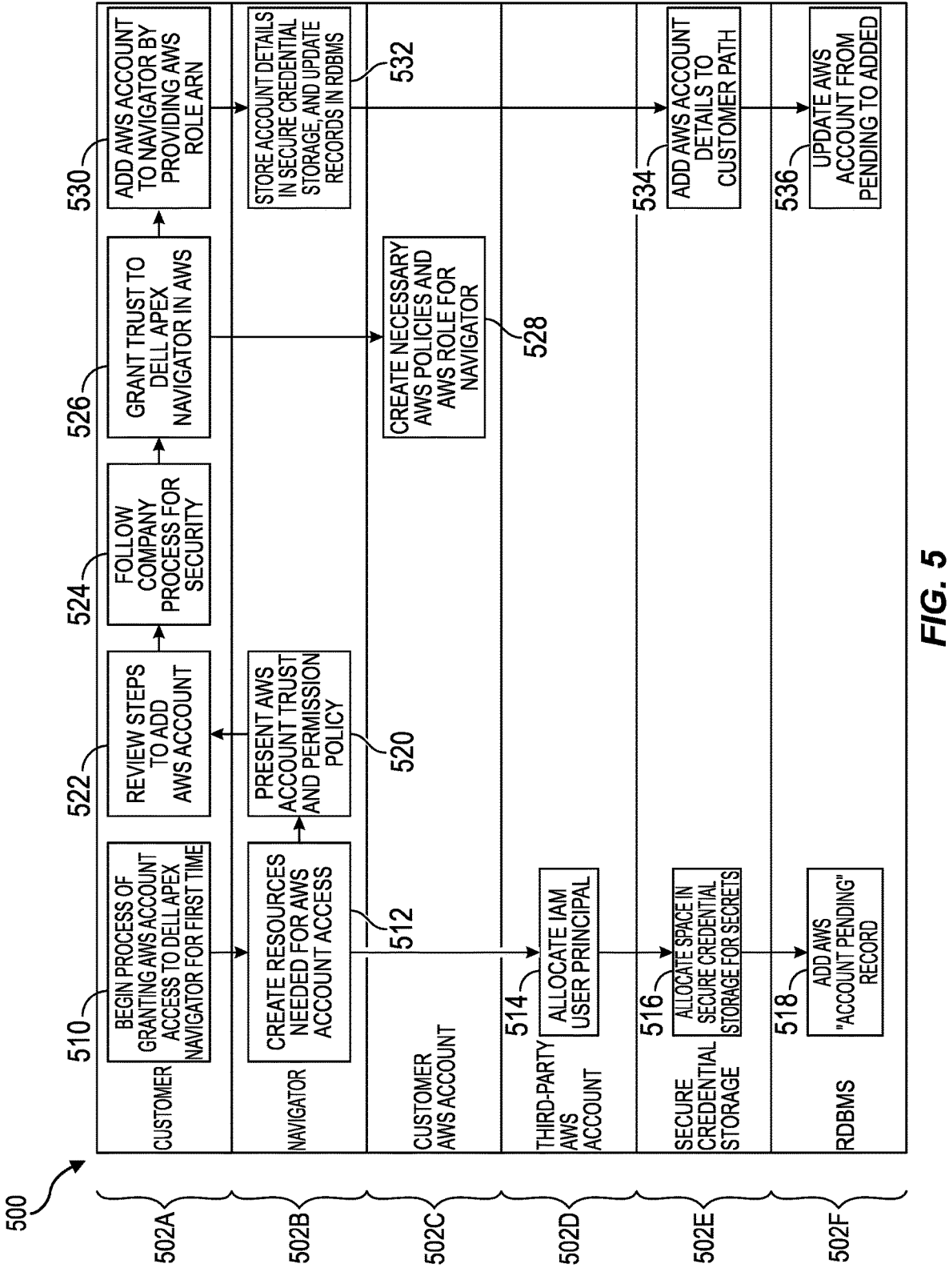
FIG. 5 illustrates an example third-party trusted access method that may be performed to grant cloud platform access to the computing resource management tool according to one embodiment of the present disclosure.

FIG. 5 illustrates an example third-party trusted access method 500 that may be performed by the third-party trusted access system 100 to grant cloud platform access to the computing resource management tool 120 according to one embodiment of the present disclosure. The method 500 may be performed at any time. In one embodiment, the method 500 may be performed each time a customer establishes certain limited access rights to the computing resources 104 leased from the cloud computing platform 102 for the first time. Additionally or alternatively, the third-party trusted access method 500 may be performed at least in part, by the third-party trusted access system 100 as described herein above with reference to FIG. 1.

The third-party trusted access method 500 is shown in rows 502a-f (collectively 502) in which the steps in row 502a are those steps that may be performed by the customer, row 502b are those steps that may be performed by the computing resource management tool 120, row 502c are those steps that may be performed by the customer from within their account 126, row 502d are those steps that may be performed by the third-party AWS organization 108, row 502e are those steps that may be performed by the secure storage 118, while row 502f are those steps that may be performed by the cloud computing platform 102.

Initially at step 510, the customer begins the process of granting its customer account 114 access to the computing resource management tool 120 for the first time. For example, the computing resource management tool 120 may present an interactive GUI to the customer that allows them to select granting access to their customer account 114. Upon receiving this request, the computing resource management tool 120 creates the resources needed for account access at step 512 in which the created resources may include, among other things, an access control policy key 112 (e.g., AWS IAM key) that is allocated within the third-party AWS organization 108 at step 514, allocated space in the secure storage 118 at step 516, and an account 'pending' record in the cloud computing platform 102 at step 518.

The computing resource management tool 120 also presents the default account trust and permission policies for review by the customer at step 520. The default account trust policies may be, for example, those policies shown in the JSON document of FIG. 4, while the permission policies may be those policies shown in the JSON document of FIG. 3. At step 522, the customer reviews the default account trust and permission policies, and at step 524, makes any desired changes to the default account trust and permission policies, such as those changes to follow the company's established processes for security.

At step 526, the customer grants trust to the computing resource management tool 120, and using their customer account 114, creates the policies and roles for the computing resource management tool 120 at step 528. The customer also adds their customer account 114 to the computing resource management tool 120 by providing a role AWS Resource Name (ARN) to the computing resource management tool 120 at step 530. The computing resource management tool 120 stores the account details in the secure storage 118 and updates the associated records in the cloud computing platform 102 at step 532. The computing resource management tool 120 also adds account details in the secure storage 118 at step 534, and updates the cloud computing platform account from 'pending' to 'added' at step 536. At this point, the computing resource management tool 120 may use the access control policy key 112 to access the computing resources 104 using the account trust and permission policies established for that account.

The steps of the aforedescribed process may be performed each time a customer is to grant limited access to its computing resources 104 to a third-party (e.g., the vendor of those computing resources 104). Nevertheless, when use of the third-party trusted access method 500 is no longer needed or desired, the process ends.

Although FIG. 5 describes an example method 500 that may be performed to grant limited access to its computing resources 104 to the vendor of those computing resources 104, the features of the method 500 may be embodied in other specific forms without deviating from the spirit and scope of the present disclosure. For example, the method 500 may perform additional, fewer, or different operations than those described in the present examples. For another example, the method 500 may be performed in a sequence of steps different from that described above. As yet another example, certain steps of the method 500 may be performed by other components than those described above.

When a vendor's products are deployed to the cloud by the computing resource management tool 120, a software management layer, such as a software defined storage service (e.g., DELL POWERFLEX) may run on top of the infrastructure layer (e.g., AWS compute, storage, networking, etc.), but it is often difficult for customers to understand the complex relationships between the two layers. That is, it may be difficult from a computing resource management tool's viewpoint to correlate computing resources from the cloud computing platform's viewpoint. This problem is further exacerbated by the fact that the cloud computing platform can potentially comprise large numbers of resources, and thus referencing one computing resource in a cloud computing platform's GUI with that of the computing resource management tool 120 can be a difficult endeavor.

Secure Remote Services (SRS) generally refers to a service provided by a computing device vendor to their customers. SRS typically uses an Automatic Remote Access (ARA) session to provide a secure, two-way connection between a customer's computing resource (e.g., IHS) and the vendor of that computing resource for remotely servicing or otherwise maintaining the customer's computing resources. For example, SRS may be used to provide software updates to a computing resource as well as to peripheral devices configured in the computing resource, provide proactive wellness monitoring and issue prevention of the computing resource, automated issue detection, notification and resolution of problems that may occur to the computing resource, and the like. SRS is virtual and offers flexibility for enterprise environments of many different sizes. Additionally, SRS may provide proactive wellness monitoring and issue prevention, automated issue detection, notification and resolution for quicker uptime, and predictive analytics-based recommendations for the customer.

Figure 6:
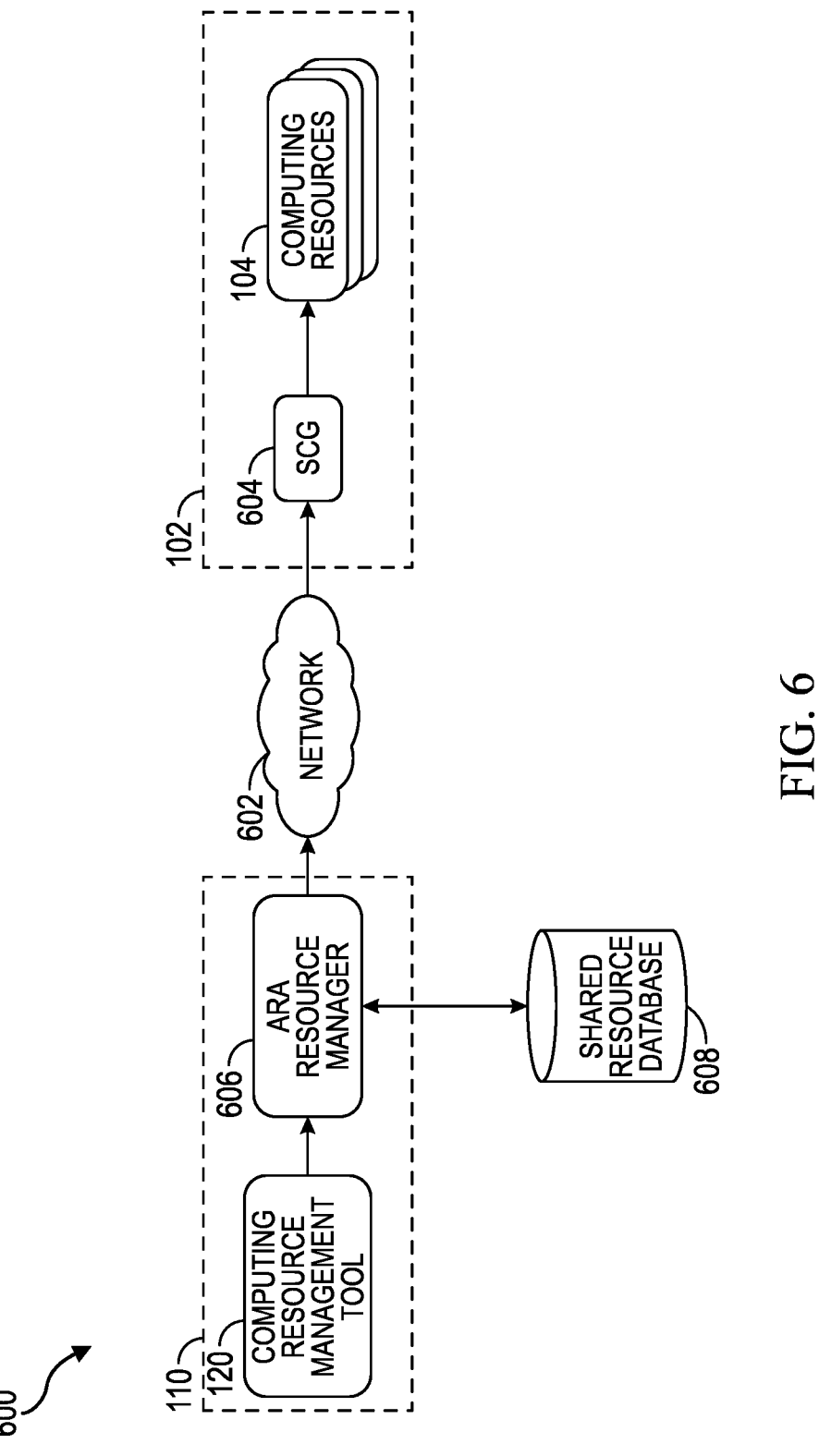
FIG. 6 illustrates an example network resource sharing system showing how the computing resource management tool may access multiple computing resources for managing their operation according to one embodiment of the present disclosure.

FIG. 6 illustrates an example network resource sharing system 600 showing how the computing resource management tool 120 may access multiple computing resources 104 for managing their operation according to one embodiment of the present disclosure. The system 600 includes a computing resource management system 110 comprising a computing resource management tool 120 that accesses a computing resource 104 through a publicly accessible network 602, such as the Internet, via a Secure Connect Gateway (SCG) 604, and an Automatic Remote Session (ARS) client 606. As will be described in detail herein below, the system 600 includes a shared resource database 608 that provides sharing of the computing resource 104 using a common ARS connection.

The ARS client 606 (a.k.a., Automatic Remote Access (ARA)) is a feature of SRS that provides a secure, remote access session between the vendor and the customer's on-premises or cloud environment. ARS is a limited resource, however, in that applications may compete with other applications to acquire and perform secure data communication, particularly when ARS is used with cloud computing platforms with relatively large numbers of computing resources. Because ARS is limited, it becomes the responsibility of a well-behaved client application to use it wisely by releasing its resources after each Input/Output (I/O) operation. Creation of an ARS session is a relatively expensive operation in that it often takes around two seconds to create a remote session. Thus, ARS creation time would likely impede performance by increasing I/O latency. Based on ARS server loading, the latency time could further increase. Clearly, creation of ARS resources can have negative impact on the latency of I/O operations. For example, it has been observed that the latency can increase up to a magnitude of six (6x) when increased loading occurs.

Figure 7:
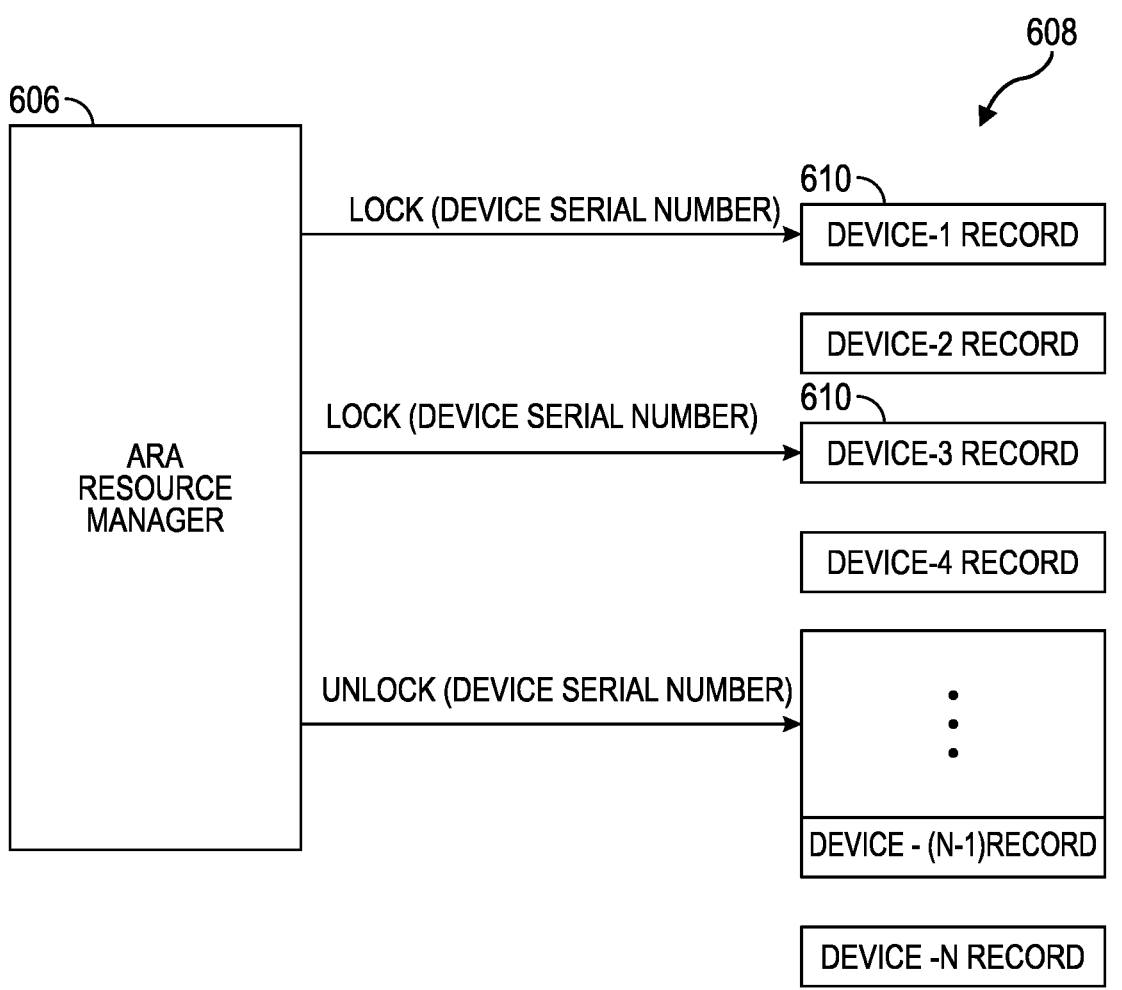
FIG. 7 illustrates how the shared resource database may be used to share multiple ARS operations using a common Automatic Remote Session (ARS) Input/Output (I/O) secure connection according to one embodiment of the present disclosure.

FIG. 7 illustrates how the shared resource database 608 may be used to share multiple ARS operations using a common ARS I/O secure connection according to one embodiment of the present disclosure. As shown, the computing resource management tool 120 may add records 610 to the shared resource database 608 for multiple, different computing resources 104 in which each record 610 stores information about a particular operation (e.g., command, request for information, etc.) to be performed on that computing resource 104. In one embodiment, the operation may include one that is specified in the permissions document 300 associated with the access control policy key 112 as described herein above.

The shared resource is saved as a record (value field) in a concurrent hash map. The shared record is created for an array, having a unique identifier called an array serial number. This unique identifier (e.g., the serial number) is used as a key to uniquely identify the record on the hash map. An atomic integer construct is used as a reference counter to track number of outstanding references to a given shared record. To guard the shared record against concurrent read/write access, a mutually exclusive lock is performed using the keys in which the serial number of the array is used as the key. Inserting a key into the array returns true if the key is not already present.

Figure 8:
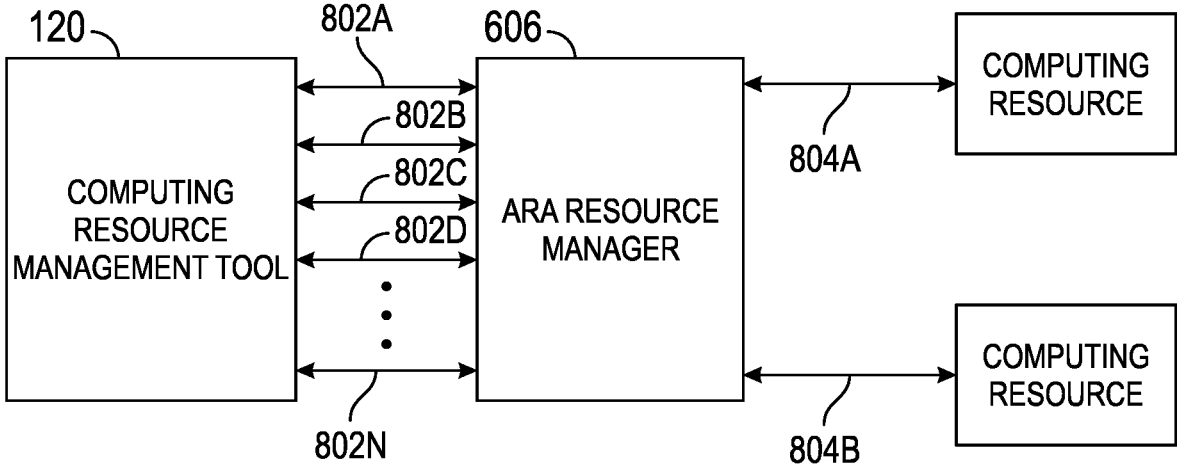
FIG. 8 illustrates how the ARA resource manager shares ARA connections for each computing resource according to one embodiment of the present disclosure.

FIG. 8 illustrates how the ARA resource manager 606 shares ARA connections for each computing resource 104 according to one embodiment of the present disclosure. As shown, the computing resource management tool 120 may issue multiple I/O requests 802*a-n* (collectively 802) to the computing resources 104*a-b*. A single, dedicated ARA channel 804*a-b* (collectively 804) is established for each computing resource 104*a-b*. Furthermore, each ARA channel 804*a-b* remains established until all I/O requests 802*a-n* have been completed. Once all I/O requests 802*a-n* for a particular computing resource 104*a-b* have been completed, the ARA channel 804*a-b* may be taken (e.g., torn) down. Later on when a new I/O request 802 is received for that computing resource 104, another ARA channel 804 may again be established for processing the newly received I/O request 802.

The I/O requests 802 may include any suitable type that can be used to manage the operation of the computing resources 104. For example, the I/O requests 802 may include messages sent to a computing resource 104 to either perform a particular action or to receive information (e.g., status information) from the computing resource 104.

Figure 9:
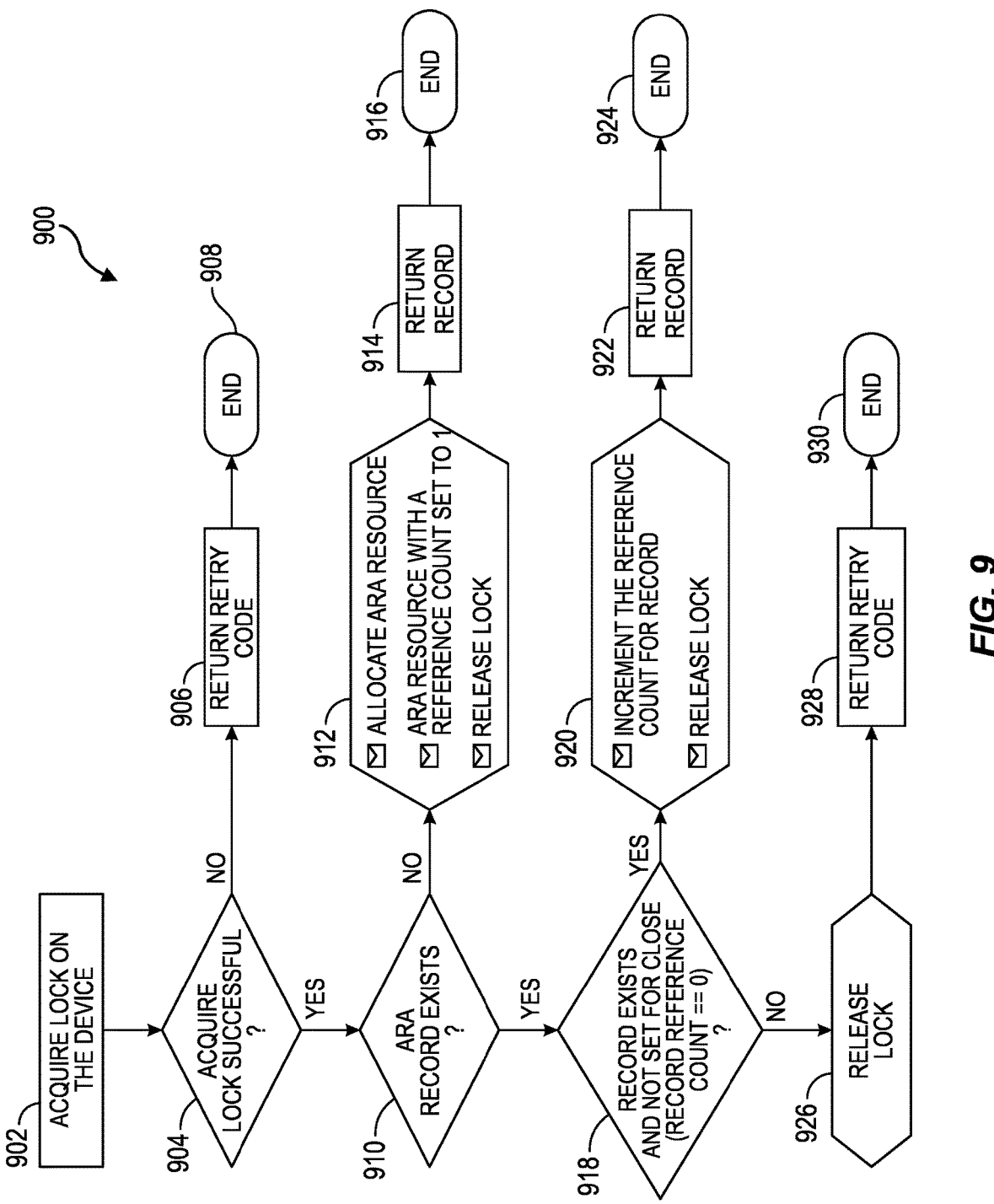
FIG. 9 illustrates an example network resource sharing method that may be performed by the network resource sharing system to enable concurrent sharing of secure ARA channels with the computing resource management tool according to one embodiment of the present disclosure.

FIG. 9 illustrates an example network resource sharing method 900 that may be performed by the network resource sharing system 600 to enable concurrent sharing of secure ARA channels 804*a-b* with the computing resource management tool 120 according to one embodiment of the present disclosure. Additionally or alternatively, the method 900 may be performed at least in part, by the ARA resource manager 606 such as described herein above. The method 900 may be performed each time a process, such as the computing resource management tool 120 attempts to perform an operation on a computing resource via a secure ARA channel 804*a-b*.

Initially at step 902, the method 900 attempts to acquire a lock on a particular computing resource 104. If the lock is not successful at step 904, processing continues at step 906 in which a retry code is generated for the calling process, which in one embodiment, is the computing resource management tool 120, and afterward in which the method 900 ends at step 908. If, however, the lock is successful, processing continues at step 910 in which the method 900 determines whether an ARA record currently exists in the shared resource database 608. If not, processing continues at step 912 in which an ARA channel 804 is established (allocated) for the computing resource 104, the ARA channel 804 is set to a reference count of '1', and the lock is released. Thereafter at step 914, a copy of the record 610 is returned back to the calling process (e.g., computing resource management tool 120), followed by ending the method 900 at step 916.

If at step 910, however, an ARA record 610 does currently exist, the method 900 continues processing at step 918 in which it determines whether the record is set to close; that is, the record reference count is set to '0'. If so, the method 900 at step 920 increments the reference count for the record 610, and releases the lock. Thereafter at step 922 a copy of the record 610 is returned back to the calling process, followed by ending the method 900 at step 924. However, if at step 918, the record 610 is not set to close, processing continues at step 926 in which the lock is released. The method 900 then sends a retry code to the calling process at step 928, followed by ending the method 900 at step 930.

The steps of the aforedescribed process may be performed each time a customer is to grant limited access to its computing resources 104 to the vendor of those computing resources 104. Nevertheless, when use of the computing resource correlation method 900 is no longer needed or desired, the process ends.

Although FIG. 9 describes an example method 900 that may be performed to grant limited access to its computing resources 104 to the vendor of those computing resources 104, the features of the method 900 may be embodied in other specific forms without deviating from the spirit and scope of the present disclosure. For example, the method 900 may perform additional, fewer, or different operations than those described in the present examples. For another example, the method 900 may be performed in a sequence of steps different from that described above. As yet another example, certain steps of the method 900 may be performed by other components than those described above.

In accordance with the foregoing, embodiments of the present systems and methods provide secure temporary privileged access to nodes in a cluster. To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a vendor computing device and a plurality of customer computing resources that are provided to a customer by a vendor associated with the vendor computing device;
at least one memory coupled to at least one processor, the at least one memory having program instructions stored thereon that, upon execution by the at least one processor, cause the processor to:
receive a plurality of first Input/Output (I/O) requests from the vendor computing device, wherein the first I/O requests are directed to one of the customer computing resources;
establish an Automatic Remote Access (ARA) session between the vendor computing device and the one customer computing resource, wherein the ARA session is used by a Secure Remote Service (SRS) provided by the vendor to the customer; and
send the first I/O requests to the one customer computing resource through the ARA session.

2. The IHS of claim 1, wherein the first I/O requests are configured to manage the operation of the computing resource.

3. The IHS of claim 1, wherein the program instructions, upon execution, further cause the IHS to:
receive a plurality of second I/O requests from the vendor computing device, wherein the second I/O requests are directed to a second one of the customer computing resources;
establish a second ARA session between the vendor computing device and the second customer computing resource; and
send the second I/O requests to the second customer computing resource through the second ARA session.

4. The IHS of claim 3, wherein the program instructions, upon execution, further cause the IHS to send the second I/O requests to the second customer computing resource concurrently as the first I/O requests are sent to the one customer computing resource.

5. The IHS of claim 1, wherein the program instructions, upon execution, further cause the IHS to take down the first ARA session after all the first I/O requests have been completed.

6. The IHS of claim 1, wherein the program instructions, upon execution, further cause the IHS to send the first I/O requests to the one customer computing resource only when a lock has been successfully completed.

7. The IHS of claim 1, wherein the program instructions, upon execution, further cause the IHS to temporarily store each I/O request as a record in a hash map.

8. The IHS of claim 1, wherein the program instructions, upon execution, further cause the IHS to:
increment a reference counter each time an I/O request is received; and
decrement the reference counter each time an I/O request is successfully completed.

9. A network resource sharing method comprising:
receiving a plurality of first Input/Output (I/O) requests from a vendor computing device for one of a plurality of customer computing resources, wherein the first I/O requests are directed to one of the customer computing resources;
establishing an Automatic Remote Access (ARA) session between the vendor computing device and the one customer computing resource, wherein the ARA session is used by a Secure Remote Service (SRS) provided by the vendor to the customer; and
sending the first I/O requests to the one customer computing resource through the ARA session.

10. The network resource sharing method of claim 9, further comprising:
receiving a plurality of second I/O requests from the vendor computing device, wherein the second I/O requests are directed to a second one of the customer computing resources;
establishing a second ARA session between the vendor computing device and the second customer computing resource; and
sending the second I/O requests to the second customer computing resource through the second ARA session.

11. The network resource sharing method of claim 10, further comprising sending the second I/O requests to the second customer computing resource concurrently as the first I/O requests are sent to the one customer computing resource.

12. The network resource sharing method of claim 9, further comprising taking down the first ARA session after all the first I/O requests have been completed.

13. The network resource sharing method of claim 9, further comprising sending the first I/O requests to the one customer computing resource only when a lock has been successfully completed.

14. The network resource sharing method of claim 9, further comprising temporarily storing each I/O request as a record in a hash map.

15. The network resource sharing method of claim 9, further comprising:
incrementing a reference counter each time an I/O request is received; and
decrementing the reference counter each time the I/O request is successfully completed.

16. A computer program product comprising a non-transitory computer-readable storage medium having program instructions stored thereon that, upon execution by an Information Handling System (IHS), cause the IHS to:
receive a plurality of first Input/Output (I/O) requests from a vendor computing device for one of a plurality of customer computing resources that are provided to a customer by a vendor associated with the vendor computing device, wherein the first I/O requests are directed to one of the customer computing resources;
establish an Automatic Remote Access (ARA) session between the vendor computing device and the one customer computing resource, wherein the ARA session is used by a Secure Remote Service (SRS) provided by the vendor to the customer; and
send the first I/O requests to the one customer computing resource through the ARA session.

17. The computer program product of claim 16, wherein the I/O request is configured to manage the operation of the computing resource.

18. The computer program product of claim 16, wherein the program instructions, upon execution, further cause the IHS to:

receive a plurality of second I/O requests from the vendor computing device, wherein the second I/O requests are directed to second one of the customer computing resources;

establish a second ARA session between the vendor computing device and the second customer computing resource; and send the second I/O requests to the second customer computing resource through the second ARA session concurrently as the first I/O requests are sent to the one customer computing resource.

\* \* \* \* \*